United States Patent
Kim et al.

(10) Patent No.: US 12,379,015 B2
(45) Date of Patent: Aug. 5, 2025

(54) HOLLOW SWIVEL ACTUATOR

(71) Applicant: AMOTECH CO., LTD., Incheon (KR)

(72) Inventors: Byung Soo Kim, Incheon (KR); Jong Hwa Shin, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 18/867,338

(22) PCT Filed: Apr. 7, 2023

(86) PCT No.: PCT/KR2023/004733
§ 371 (c)(1),
(2) Date: Nov. 19, 2024

(87) PCT Pub. No.: WO2023/234544
PCT Pub. Date: Dec. 7, 2023

(65) Prior Publication Data
US 2025/0146557 A1    May 8, 2025

(30) Foreign Application Priority Data

May 31, 2022 (KR) .................. 10-2022-0066822
Jan. 5, 2023 (KR) .................. 10-2023-0001843

(51) Int. Cl.
*F16H 57/039* (2012.01)
*F16H 1/30* (2006.01)
(Continued)

(52) U.S. Cl.
CPC ............ *F16H 1/46* (2013.01); *F16H 57/039* (2013.01); *F16H 57/12* (2013.01); *F16H 1/30* (2013.01);
(Continued)

(58) Field of Classification Search
CPC ..... F16H 1/30; F16H 1/34; F16H 1/46; F16H 3/68; F16H 57/039; F16H 57/12; H02K 7/116; H02K 7/1163; H02K 7/1166
See application file for complete search history.

(56) References Cited

U.S. PATENT DOCUMENTS 4,777,847 A * 10/1988 Pickles ............... F16H 1/46
                                                   475/333
2016/0160560 A1* 6/2016 Mazzoni .............. E06B 9/72
                                                   475/331
2023/0369939 A1* 11/2023 Kim ................... H02K 7/116

FOREIGN PATENT DOCUMENTS

JP    2005176527 A    6/2005
KR    101687568 B1   12/2016
(Continued)

OTHER PUBLICATIONS

International Search Report—PCT/KR2023/004733 dated Jul. 11, 2023.

*Primary Examiner* — Tinh Dang
(74) *Attorney, Agent, or Firm* — CANTOR COLBURN LLP

(57) ABSTRACT

Provided is a hollow swivel actuator including: a lower housing in which a driving motor is arranged; and an upper housing in which three gear trains and three pinion gear units for reduction are arranged at intervals of 120 degrees. A rotor worm gear for transferring an output of the driving motor is coupled through gear engagement to a ring gear integrally formed on a rotational table to transfer reduced rotational power therebetween. The hollow swivel actuator obtains a great reduction ratio by: primary reduction between the rotor worm gear of the driving motor and first to third worm wheels of the first to third gear trains; secondary reduction between first to third worm gears and fourth to sixth worm wheels of the first to third pinion gear (Continued)

units; and tertiary reduction between the ring gear and the first to third pinion gears, thereby achieving a large torque increase.

10 Claims, 9 Drawing Sheets

(51) Int. Cl.
    *F16H 1/46*         (2006.01)
    *F16H 3/68*         (2006.01)
    *F16H 57/12*       (2006.01)
    *H02K 7/116*      (2006.01)
    *F16H 1/34*         (2006.01)

(52) U.S. Cl.
    CPC ............... *F16H 1/34* (2013.01); *F16H 3/68* (2013.01); *H02K 7/116* (2013.01); *H02K 7/1163* (2013.01); *H02K 7/1166* (2013.01)

(56) References Cited

FOREIGN PATENT DOCUMENTS

| | | | |
|---|---|---|---|
| KR | 101920041 B1 | 11/2018 | |
| KR | 20190047176 A | 5/2019 | |
| KR | 20220056821 A | 5/2022 | |
| WO | WO-2022203279 A1 * | 9/2022 | ............. B60Q 1/076 |

* cited by examiner

HOLLOW SWIVEL ACTUATOR

TECHNICAL FIELD

The present invention relates to an actuator, and more particularly, to a hollow swivel actuator capable of increasing fracture strength by minimizing backlash and increasing a brake torque by coupling three gear trains to a rotor worm gear of a driving motor at intervals of 120 degrees.

BACKGROUND ART

An electric actuator rotates or linearly moves a passive object with a high torque rotational force obtained by torque conversion of the rotational force generated from a rotating power source.

In general, a conventional actuator uses a direct-current (DC) motor as a rotating power source, and the rotor output of the DC motor is torque-converted through a gear train in which a worm gear and a plurality of spur gears which are integrally formed in a rotor output end are gear-engaged to generate a high torque rotational output from an actuator output end.

Since the conventional electric actuator uses a DC motor having an external casing as a rotating power source, the magnet for sensing rotational position of the rotor is not embedded in the casing, but is attached separately to the outside and the rotational position of the rotor is sensed by using an external Hall sensor, and thus, the structure of connecting the Hall sensor to a printed circuit board (PCB) having an embedded motor driving circuit is complicated.

If the actuator does not use a Hall sensor, only forward and reverse rotational motions are possible.

In general, the actuator has a low height of the housing as a whole product in use, and one of the horizontal and the vertical lengths is configured to have a longer shape. Accordingly, it is difficult to employ a structure in which a DC motor having an outer casing is vertically mounted on the inner bottom of the housing.

In the case of using a DC motor, the brake torque should be increased using a worm gear because the rotor should be held in a stationary position when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and a bearing that needs to hold a worm shaft.

Second, the structure of connecting the motor power to a motor controller becomes complicated.

Third, rotational position information of the rotor is required for accurate position control in the actuator. To this end, since a rotational position sensing magnet is arranged at the bottom of a worm gear of a DC motor and a rotational position sensing Hall sensor integrated circuit (IC) is applied, the structure of connecting a Hall sensor to a PCB is complicated to use DC power and to sense the rotational position.

Fourth, in a gear train that uses multiple spur gears to obtain a large reduction ratio, the tolerance of the rotating power of the driving motor increases, resulting in a large backlash and difficulty in controlling the precise position.

Swivel actuators are applied to car seats in vehicles so that the car seats are rotated by a desired angle to conduct meetings while the occupants face each other when conducting the meetings or the like inside vehicles.

Korean Patent Application Publication No. 10-2022-0056821 (Patent Document 1) discloses a swivel actuator including: a cylindrical housing in which a hollow cylindrical portion protrudes from a bottom of a center thereof and first and second stepped portions protrude from an inner side wall thereof; a driving motor which is arranged on a bottom surface of the housing and has a first worm gear integrally formed on an outer circumference of an extension unit extending to an upper portion of the rotor; a gear train for reduction which is arranged on an upper portion of the second stepped portion, is coupled to an outer circumference of the first worm gear, has a first worm wheel gear-engaged to the first worm gear on one side of a power transmission shaft, and has a second worm gear formed on the other side of the power transmission shaft; a pinion gear unit having a second worm wheel gear-engaged to the second worm gear at a lower end thereof and a pinion gear integrally formed on an upper end thereof; and a rotational table gear-engaged to a ring gear having the pinion gear of the pinion gear unit integrally formed on an inner side of a side surface portion thereof, to rotate, and having a passive object fixed to an upper surface thereof.

The actuator of Patent Document 1 has a structure in which a first worm gear formed on an outer circumference of a rotor of a driving motor is connected with a ring gear formed on a rotational table by using a single pinion gear unit and a single gear train for reduction in which a worm wheel and a worm gear are installed on a power transmission shaft in order to drive the rotational table by decelerating the rotation speed of the driving motor.

Since the swivel actuator of Patent Document 1 is a structure that transmits rotational power using one gear train between the driving motor and the pinion gear unit driving the rotational table, the tolerance between gears may be reduced, but not completely reduced, and the brake torque that controls the left and right rotation of a passive body (i.e., car seat) that rotates with the rotational table is low, making it impossible to suppress vibration generation.

As a result, the actuator of Patent Document 1 does not minimize backlash and at the same time has a problem that it is difficult to suppress the vibration generation of the rotational table.

DISCLOSURE

Technical Problem

Accordingly, it is an objective of the present invention to provide a hollow swivel actuator that may increase fracture strength by minimizing backlash and increasing brake torque by combining three first to third gear trains in which worm wheels and worm gears are integrally formed at intervals on a power transmission shaft to a cylindrical rotor worm gear extended to a rotor of a driving motor at 120 degrees intervals and rotating a rotational table with a ring gear installed thereon by first to third pinion gear units.

It is another objective of the present invention to provide a hollow swivel actuator in which a set screw is installed in a bearing housing to suppress left and right displacement of both ends of three power transmission shafts in the bearing housing, thereby eliminating tolerances generated during inter-gear coupling and achieving zero backlash.

It is another objective of the present invention to provide a hollow swivel actuator that may minimize backlash and suppress vibration generation of a rotational table by suppressing left and right displacement of three power transmission shafts each using a set screw while gear-coupling three gear trains inside an upper housing with a rotor worm gear.

It is another objective of the present invention to provide a hollow swivel actuator that may easily organize compartment between a driving motor and gear trains and may improve productivity of an assembly work by placing the driving motor in a lower housing and arranging first to third gear trains and first to third pinion gear units in an upper housing stacked and assembled in the lower housing.

Technical Solution

According to an aspect of the present invention, there is provided a hollow swivel actuator including a lower housing having a hollow cylindrical portion protruding upward at a center thereof, an upper housing stacked and assembled on an upper portion of the lower housing and having a through hole formed in a central portion thereof in which the hollow cylindrical portion protrudes upward through the through hole, a driving motor arranged on a bottom surface of the lower housing and having a cylindrical rotor worm gear integrally formed on an outer circumference of a cylindrical rotor support extending upward from the rotor, first to third gear trains arranged and coupled at intervals of 120 degrees on the outer circumference of the rotor worm gear protruding through the upper housing, and having first to third worm wheels formed to be gear-coupled to the rotor worm gear on one side of each of first to third power transmission shafts to achieve primary reduction and first to third worm gears formed on the other side of each of the first to third power transmission shafts, first to third pinion gear units having fourth to sixth worm wheels formed on bottom ends thereof so as to be gear-coupled to the first to third worm gears to achieve secondary reduction, and first to third pinion gears integrally formed on top ends thereof, and a rotational table in which the first to third pinion gears of the first to third pinion gear units are gear-coupled to a ring gear integrally formed inside a side portion thereof to achieve a tertiary reduction.

Both ends of each of the first to third power transmission shafts are rotatably supported by a plurality of bearings, and a plurality of set screws may be installed in the bearing housing in which the plurality of bearings are embedded to suppress the occurrence of left and right displacements of the first to third power transmission shafts.

The hollow swivel actuator according to the present invention may further include a plurality of set screw adjustment through holes formed on a wall of the upper housing to push the plurality of set screws from the outside to one side to fix the first to third power transmission shafts.

In addition, a first reduction ratio of the primary reduction, a second reduction ratio of the secondary reduction, and a third reduction ratio of the tertiary reduction may be sequentially set less toward a rear end.

The driving motor includes a rotor having a cylindrical rotor support having a cup shape at a lower end thereof, and rotatably coupled to an outer circumference of the hollow cylindrical portion, a stator which is arranged on the outer side of the rotor with an air gap, generates a rotating magnetic field, and is arranged on the bottom of the housing to rotate the rotor, first and second bearings arranged between the cup-shaped lower end of the rotor support and a lower end of the hollow cylindrical portion to rotatably support the rotor, and stacked in series, and a bearing support press-coupled to the outer circumference of the hollow cylindrical portion to press the second bearing.

The hollow swivel actuator according to the present invention further includes first and second bearings arranged between a lower end of the cylindrical rotor support and a lower end of the hollow cylindrical portion of the lower housing to rotatably support the rotor and stacked in series, and a third bearing rotatably supporting the rotational table on an outer circumference of a top end of the hollow cylindrical portion.

In addition, the hollow swivel actuator according to the present invention further includes a bearing support press-coupled to the outer circumference of the cylindrical rotor support and arranged between the second bearing and the third bearing to press the second bearing.

In addition, the hollow swivel actuator according to the present invention further includes first to third support shafts having lower ends fixedly installed through the bottom of the upper housing and rotatably supporting the first to third pinion gear units, respectively.

A virtual circle formed by the first to third support shafts may form the same concentric circle as the rotational table, the first to third support shafts may be arranged at intervals of 120 degrees on the virtual circle, and the first to third pinion gears may be gear-coupled to the ring gear at three points at intervals of 120 degrees.

In addition, the rotor support, the cylindrical rotor worm gear, the first virtual circle formed by the first to third worm wheels, and a second virtual circle formed by the first to third support shafts, and the rotational table may be arranged based on the same concentric circle.

Advantageous Effects

As described above, in the present invention, a worm wheel and a worm gear are integrally formed at intervals on a power transmission shaft to provide a power transmission structure capable of minimizing backlash by a gear train change structure in which the number of coupling gears is minimized. As a result, the present invention may reduce overall size and secure a space compared to a conventional gear train in which a plurality of spur gears are combined, thereby increasing degree of freedom in design and reducing costs.

In addition, according to the present invention, a BLDC driving motor is installed on the bottom of the lower housing, and three gear trains, in each gear train of which a worm wheel and a worm gear are integrally formed at intervals on a power transmission shaft, are coupled at intervals of 120 degrees to the rotor worm gear formed at the output of the rotor protruding inside the upper housing, thereby minimizing backlash and simultaneously suppressing vibration generation of the rotational table. In other words, in the present invention, three gear trains each in which a worm wheel and a worm gear are integrally formed in a power transmission shaft at intervals may be combined with a cylindrical worm gear extended around a rotor of a driving motor to minimize backlash and increase brake torque to increase the fracture strength.

In general, the swivel actuator is rotatably supported on a fixed frame fixed to a floor panel inside a vehicle, and a car seat is installed on the rotational table installed and rotating on top of the swivel actuator.

In this case, the swivel actuator is driven in an electric manner so that the rotational table may be rotated in a desired direction for the fixed frame according to a user's manipulation of an operation switch. The swivel actuator may be driven in a manner of rotating by a preset angle in conjunction with a manipulation (turn-on) of the operation switch or stopping at a position of the rotated swivel actuator when a manipulation of the operation switch is stopped (turn-off) while rotating in conjunction with the manipulation (turn-on) of the operation switch.

When a user drives the swivel actuator in an electric manner to rotate by a desired rotation angle and then stop, it is required to have a predetermined brake torque between the output of the driving motor, that is, the rotor worm gear and the rotational table, according to the manipulation (turn-on) of the operation switch.

Since the rotational table being rotationally driven has rotational inertia, it is necessary to increase the brake torque determined by a power transmission mechanism of the gear train and the pinion gear unit, which are coupled between the rotor worm gear and the ring gear of the rotational table to stop at a desired position.

In the rotational table in which the car seat on which a user is seated is installed, the number of engagement gears between the ring gear and the pinion gear arranged at the outer side of the rotational table is small, and thus a large force is not overcome. In this case, since the pinion gear, which is a spur gear, has a smaller gear diameter than the ring gear, the number of engagement gears between the ring gear and the pinion gear is about 1 to about 1.5 per pinion gear.

Therefore, in order to increase the brake torque between the ring gear and the pinion gear, it is desirable to increase the number of engagement gears (the number of gear teeth in contact) as many as possible.

In this case, the power transmission mechanism in which three gear trains are arranged at 120° intervals to form an equilateral triangle with respect to the rotor worm gear, and three pinion gears of the three pinion gear units are evenly arranged at 120° intervals in order to be gear-coupled together at three points of the ring gear of the rotational table may obtain a greater brake torque than the power transmission mechanism in which a single or pair of gear trains and a single or pair of pinion gear units are gear-coupled at one or two points of the ring gear of the rotor worm gear and the ring gear of the rotational table.

That is, in the present invention, three gear trains are arranged in the rotor worm gear, and three pinion gears of the three pinion gear units employ a power transmission mechanism gear-coupled at three points of the ring gear of the rotational table, thereby obtaining a brake torque greater than that of the related art.

As described above, when the brake torque increases, the degree of freedom for selecting the material of the gear is increased.

Although a steel-use-stainless (SUS)-processed product is used as a gear material in the related art, it is currently possible to use a product made of a sintered metal or a plastic-processed product, and thus it is preferable to have a better competitiveness in terms of a price and a productivity, and thus it is preferable to increase the number of teeth of the engagement gears when engaged with each other.

In this invention, three gear trains are concentrically arranged at 120 degrees intervals along the circumference of the hollow rotor worm gear to form an equilateral triangle, and the three pinion gears of the three pinion gear units are concentrically arranged at 120 degrees intervals with respect to the hollow rotor worm gear, so that the three pinion gears are gear-coupled with a balanced force at three points of the ring gear of the rotational table, which is advantageous for suppressing the vibration generation of the rotational table. To this end, in this invention, for hollow rotor worm gears, a virtual circle formed by three worm wheels of three gear trains, a virtual circle formed by three pinion gears of three pinion gear units, and a rotational table are all concentrically arranged.

In addition, when the three gear trains are arranged in a regular triangular structure inside the upper housing as described above, it is possible to reduce the tolerance between the gears, but it is difficult to completely reduce the tolerance. In other words, the gap between the gears is minimized, but the tolerance between the gears occurs, resulting in a gap between the gears, which may cause the rotational table gear-coupled with the pinion gear unit to shake left and right.

This problem may be caused by the occurrence of the left and right displacement of both ends of the power transmission shafts forming the gear train in the bearing housing. Accordingly, in the present invention, a set screw is added to the rear end of the bearing housing to suppress occurrence of left and right displacement of both ends of the power transmission shafts in the bearing housing, and thus, by suppressing the left and right displacement of the power transmission shafts, the tolerance (gap) that occurs when the gears are coupled between the worm gear of the gear train and the worm wheel of the pinion gear unit may be eliminated. As a result, the gap between the pinion gear of the pinion gear unit and the ring gear of the rotational table may be removed to zero the backlash.

BEST MODE FOR CARRYING OUT THE INVENTION

Figure 1:
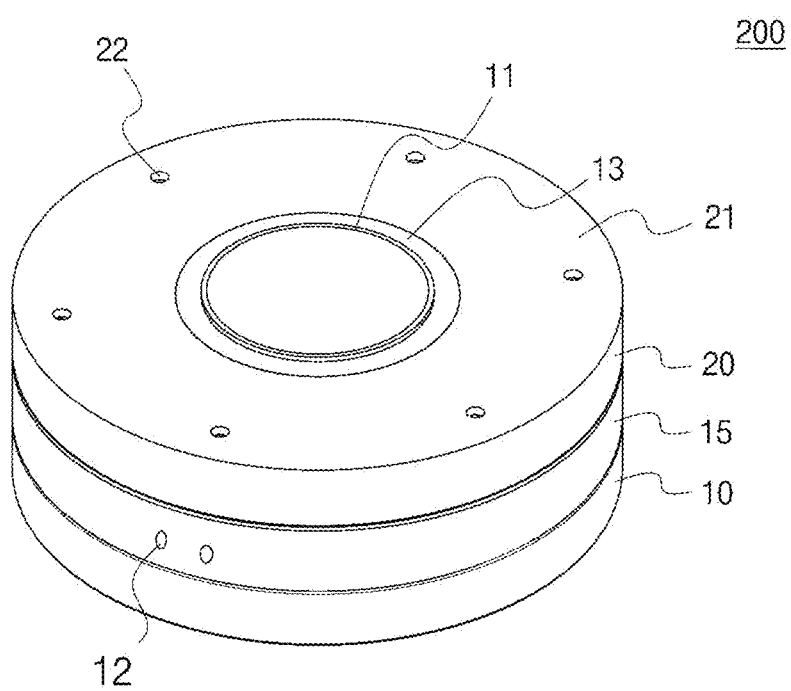
FIGS. 1 to 3 are a perspective view, a plan view, and a cross-sectional view taken along line A-A of FIG. 2, respectively, of a hollow swivel actuator according to a preferred embodiment of the present invention.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A swivel actuator according to the present invention is used for rotating a passive object main body, that is, a car seat for a vehicle to the left and right together with a rotational table. In the following description, a hollow swivel actuator for driving a passive object by using a BLDC-type driving motor as a power source is described.

It is difficult to apply a BLDC motor to a general motor, but in this invention, the BLDC motor is vertically erected and the size of the BLDC motor in a radial direction is increased to increase motor torque. The driving motor has a stator and a rotor arranged on the bottom surface of the housing, and uses an inner rotor type BLDC motor.

An actuator according to the conventional art includes a motor portion made of a DC motor, a gear part, and a rotating part, which are configured as separate components, so when assembling the actuator to a main body using an actuator product, there are many problems such as assembly tolerance and supply of parts.

The swivel actuator according to the present invention may be applied for rotating, together with a rotational table, a passive object installed in the rotational table.

A swivel actuator according to this invention includes a BLDC-type driving motor, a gear train that transmits the rotational power of the driving motor to a rotational table and increases torque by reduction, and the rotational table which is rotated by an output of the gear train, wherein a passive object is coupled to the rotational table so that the passive object is rotated together with the rotational table. In this case, the driving motor, the gear train, and the rotational table are integrally assembled to the housing.

A hollow swivel actuator according to the present invention is formed in a disc shape, and includes a through hole for withdrawing a cable, which is formed in a central portion thereof as an inner hollow shape, and a plurality of coupling holes, for example, four coupling holes, which are formed on an upper portion of a rotating body (a rotational table) so as to be connected to a passive object (e.g., an electric seat), in which a fixing bolt may be coupled to each of the coupling holes so as to be fixed to the electric seat.

An actuator according to the present invention has an annular stator arranged on the bottom of the housing and a rotor arranged therein and having a worm gear integrally formed on the upper side thereof. A worm wheel of a power transmission shaft forming a gear train is gear-engaged with the rotor worm gear, a worm gear formed on the other end of the power transmission shaft is coupled to a worm wheel located at the lower end of a pinion gear unit, and a pinion gear located at the upper end of the pinion gear unit is coupled to a ring gear formed inside a lateral surface portion of a rotational table, so as to rotate the rotational table.

In this case, around the rotor worm gear, three gear trains are arranged to form a regular triangle at intervals of 120 degrees so that respective worm wheels of power transmission shafts forming the three gear trains are engaged with the rotor worm gear. Each worm gear formed at the other end of each of the power transmission shafts is coupled to a worm wheel located at the bottom of each of the three pinion gear units. The three pinion gears positioned at the upper ends of the three pinion gear units are coupled to the ring gear formed inside the lateral surface portion of the rotational table at three points at intervals of 120 degrees to rotate the rotational table with uniform force.

As described above, the power transmission mechanism in which three gear trains are arranged at 120° intervals to form an equilateral triangle with respect to the rotor worm gear, and three pinion gears of the three pinion gear units are evenly arranged at 120° intervals in order to be gear-coupled together at three points of the ring gear of the rotational table may increase a brake torque by increasing the number of teeth of engagement gears when gear-engaged, than the power transmission mechanism in which a single or pair of gear trains and a single or pair of pinion gear units are gear-coupled at one or two points of the ring gear of the rotor worm gear and the ring gear of the rotational table.

In this invention, for hollow rotor worm gears, a virtual circle formed by three worm wheels of three gear trains, a virtual circle formed by three pinion gears of three pinion gear units, and a rotational table are all concentrically arranged to suppress the generation of vibration in the rotational table.

Figure 2:
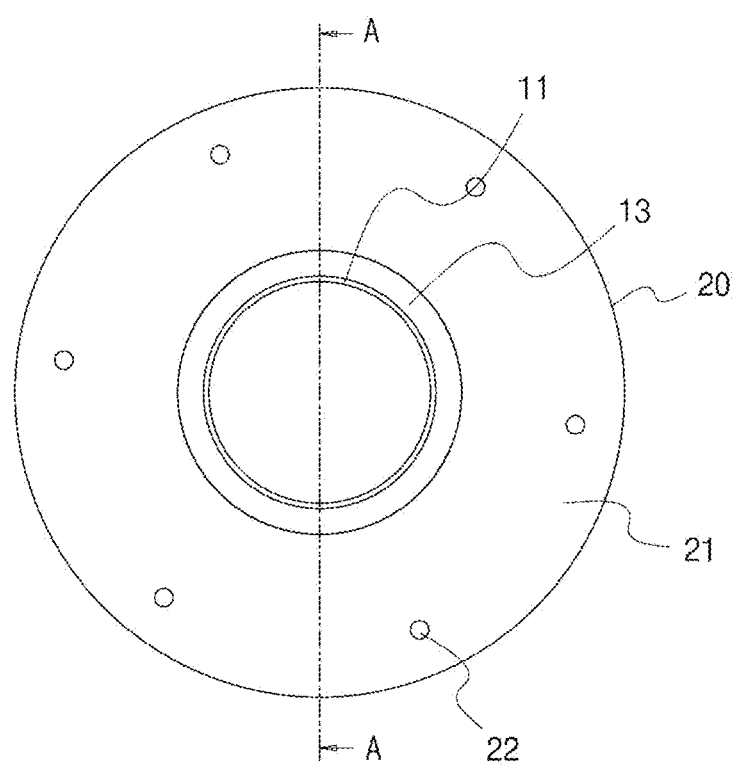
Figure 3:
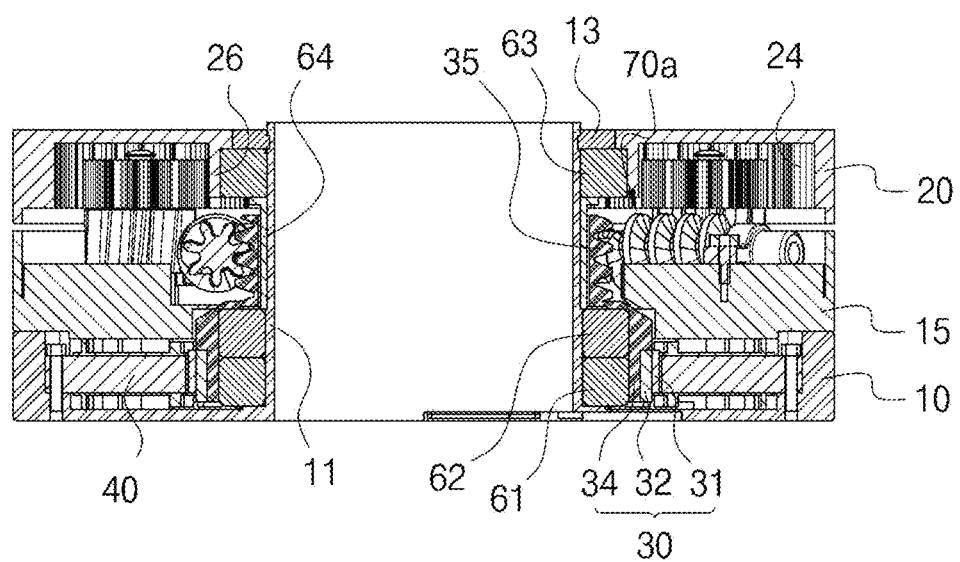
Figure 4:
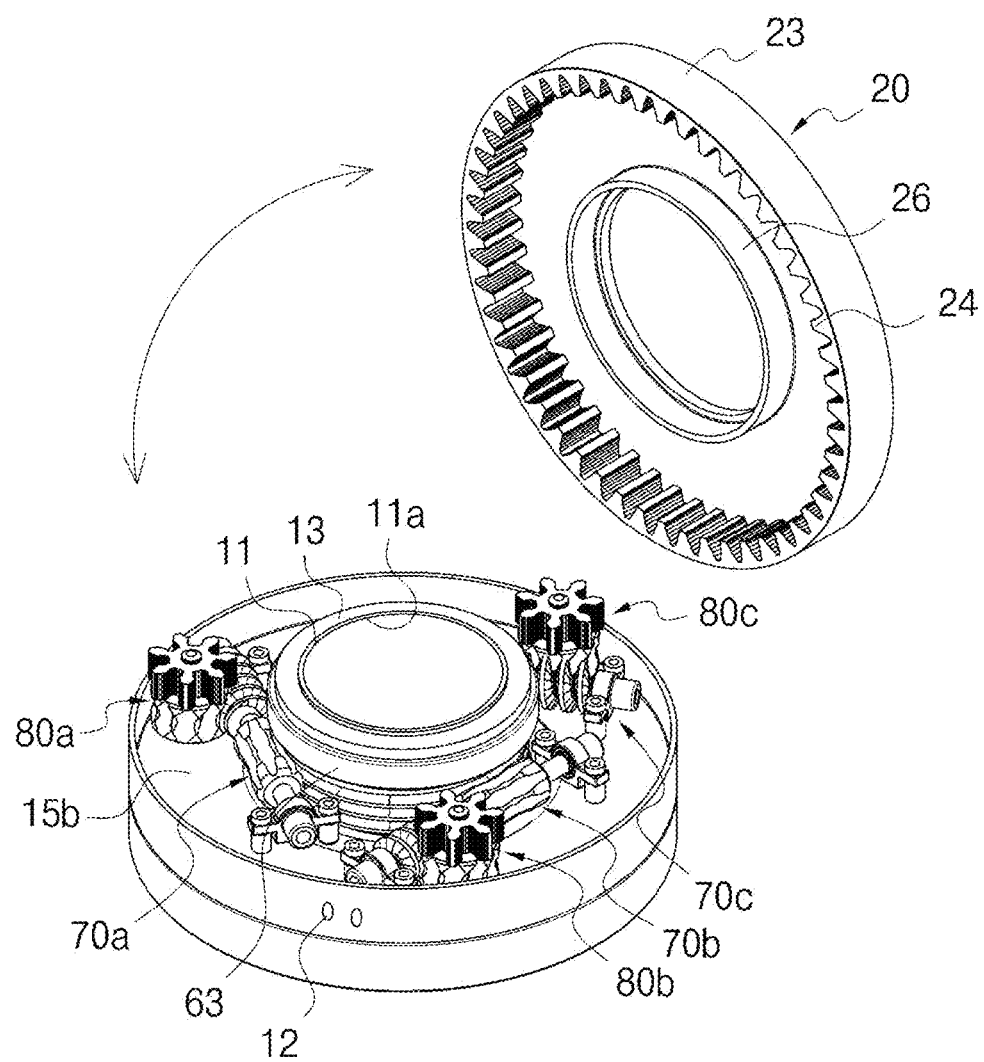
FIG. 4 is an exploded perspective view of a rotational table of a hollow swivel actuator according to a preferred embodiment of the present invention.
Figure 5:
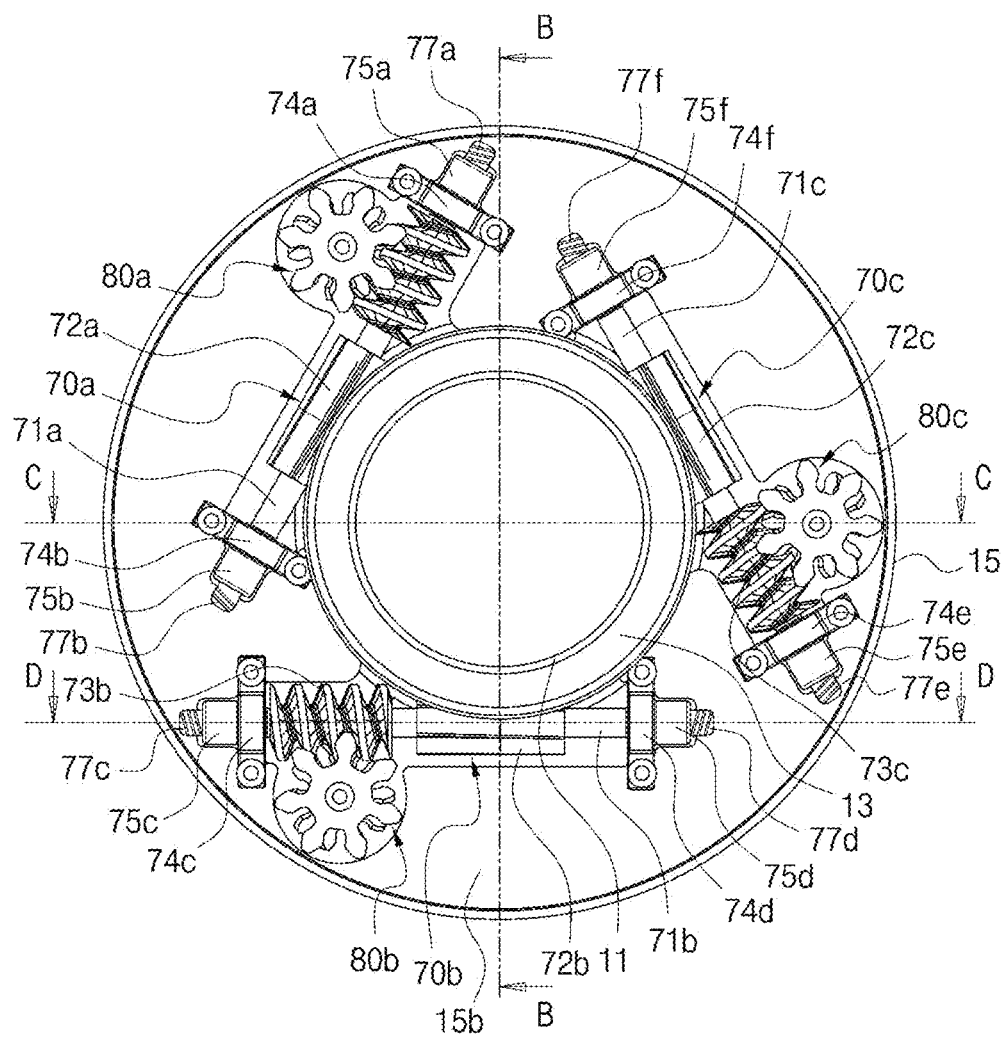
FIG. 5 is a plan view from which a rotational table of a hollow swivel actuator according to a preferred embodiment of the present invention is removed.
Figure 6A:
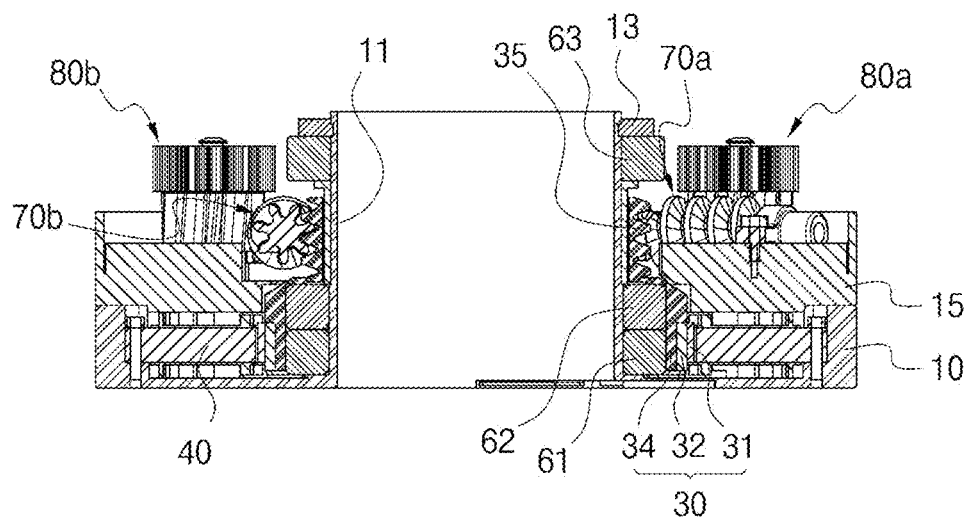
FIGS. 6A to 6C are cross-sectional views taken along line B-B, line C-C, and line D-D of FIG. 5, respectively.
Figure 6B:
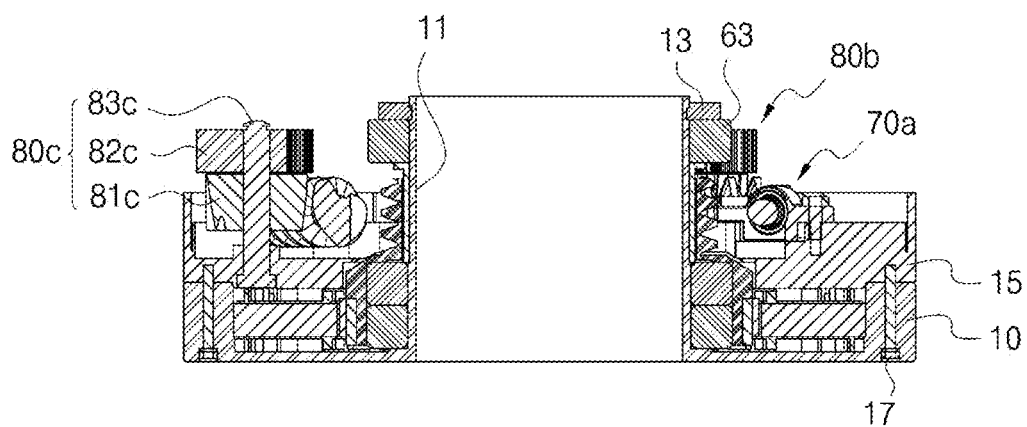
Figure 6C:
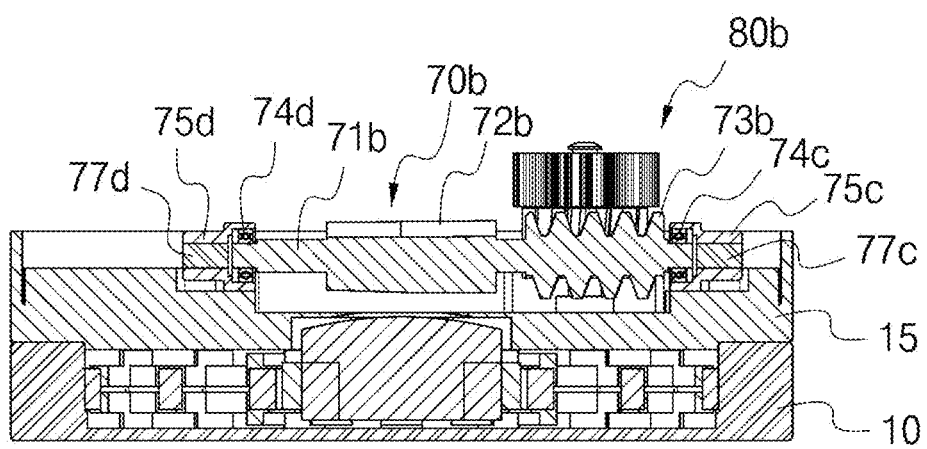
Figure 7:
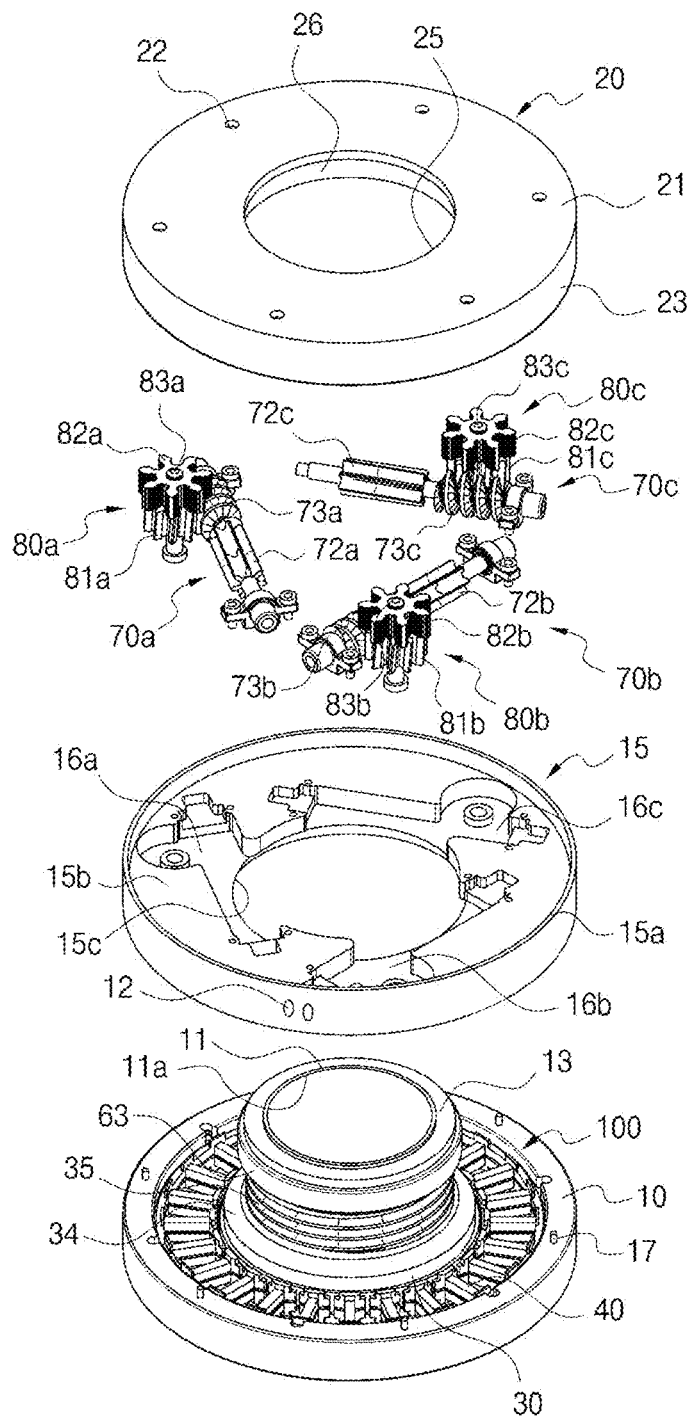
FIGS. 7 and 8 are a module-each exploded perspective view and a fully exploded perspective view of a hollow swivel actuator according to a preferred embodiment of the present invention, respectively.
Figure 8:
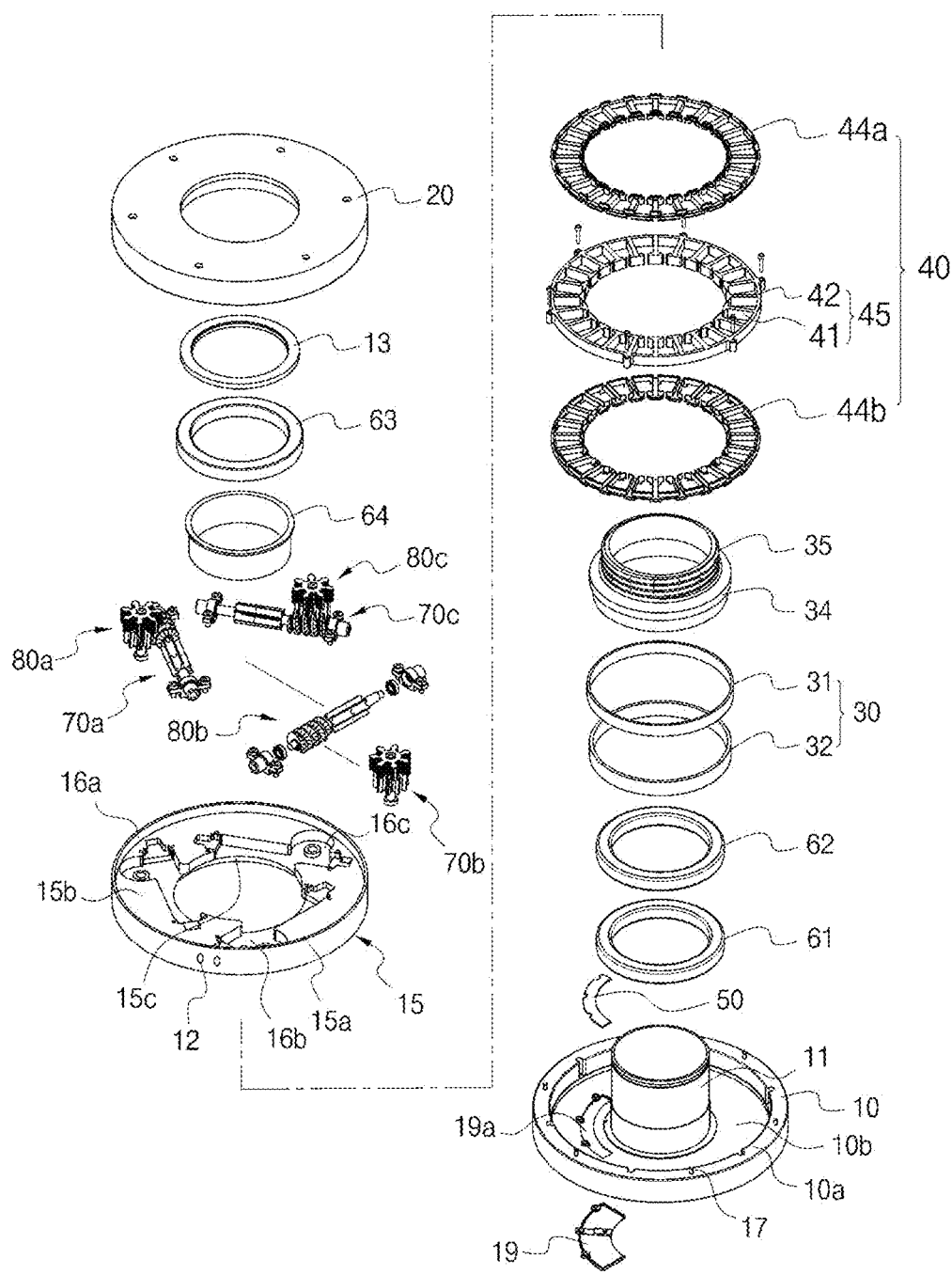

Referring to FIGS. 1 to 8, a hollow swivel actuator 200 according to a preferred embodiment of the present invention includes: a lower housing 10 having a hollow cylindrical portion 11 protruding upward at a center thereof; an upper housing 15 stacked and assembled on an upper portion of the lower housing 10 and having a through hole 15c formed in a central portion thereof in which the hollow cylindrical portion 11 protrudes upward through the through hole 15c; a driving motor 100 which is arranged on a bottom surface 10b of the lower housing 10 and has a rotor worm gear 35 integrally formed on an outer circumference of an extension unit extending to an upper portion of a rotor 30; first and second gear trains 70a to 70c which are arranged on the bottom 15c of the upper housing 15, and coupled to the outer circumference of the rotor worm gear 35 in which first to third worm wheels 72a to 72c gear-coupled to the rotor worm gear 35 are respectively formed at one-side portions of first to third power transmission shafts 71a to 71c, and first to third worm gears 73a to 73c are respectively formed at the other-side portions of the first to third power transmission shafts 71a to 71c; first to third pinion gear units 80a to 80c in which fourth to sixth worm wheels 81a to 81c gear-coupled to the first to third worm gears 73a to 73c are formed at the lower ends of first to third pinion gear units 80a to 80c, respectively, and first to third pinion gears 82a to 82c are integrally formed on the upper ends of the first to third pinion gear units 80a to 80c, respectively; and a rotational table 20 configured to rotate in which the first to third pinion gears 82a to 82c of the first to third pinion gear units 80a to 80c are gear-coupled to a ring gear 24 integrally formed on the inner side of a side surface portion 23 of the rotational table 20.

The lower housing 10 has a hollow cylindrical portion 11 protruding from the center thereof, and a driving motor 100 is installed in a bottom 10b between the hollow cylindrical portion 11 and a circular wall 10a.

In addition, the upper housing 15 is stacked and assembled on the upper portion of the lower housing 10, and a plurality of fixing bolts or screws 17 are fastened and fixed between the upper housing 15 and the lower housing 10. On the bottom 15b of the upper housing 15, the first to third gear trains 70a to 70c and the first to third pinion gear units 80a to 80c are accommodated therein, and a rotational table 20 is rotatably installed on the upper portion of the upper housing 15.

The driving motor 100 generates rotational power, and the first to third gear trains 70a to 70c receive the rotational power and perform torque conversion by decelerating the speed to generate reduced rotational power with increased torque.

Additionally, the first to third pinion gear units 80a to 80c are installed vertically on the first to third worm gears 73a to 73c of the first to third gear trains 70a to 70c, respectively, to receive reduced rotational power with increased torque, and then transmit the same to the ring gear 24 integrated with the rotational table 20.

The driving motor 100 may be configured as an inner rotor type in which a rotor 30 is arranged inside a stator 40, and includes the rotor 30 rotatably coupled to the outer circumference of the hollow cylindrical portion 11 of the lower housing 10, and the stator 40 arranged at an outer side of the rotor 30 with an air gap therebetween and arranged on an upper surface of the lower housing 10 to rotate the rotor 30 by generating a rotating magnetic field, wherein the rotor worm gear 35 is integrally formed on the outer circumferential portion of the extension portion extending to the upper portion of the rotor 30.

In the rotor 30, a magnet 31 arranged on the outer circumference of a back yoke 32 located inside the rotor 30, may include a magnet which includes split magnet pieces of a plurality of N-poles and S-poles or a magnet in which N-poles and S-poles are split-magnetized in multiple poles in a ring-shaped magnet. The back yoke 32 is installed on a rear surface of the magnet 31 to form a magnetic circuit.

The stator 40 includes: a stator core 45 having a plurality of teeth 41 each having a "T" shape and a back yoke 42 interconnected with the plurality of teeth 41 to form a magnetic circuit; upper and lower insulators 44a and 44b made of insulating material, which are integrally formed to surround the outer circumferential surface on which coils 43 of each of the plurality of teeth are wound; and the coil 43 wound around the outer circumferential surfaces of the insulators 44a and 44b.

In this case, the insulator 44a and 44b may be integrally formed as a bobbin and a stator support surrounding the back yoke 42 along with the plurality of teeth 41.

The swivel actuator 200 according to this invention may include the BLDC motor with a 20 pole-18 slot structure, for example, as the driving motor 100. In addition, when the coil 43 of the stator 40 is wound on the plurality of teeth 41, the driving motor 100 may be configured to wind the coil 43 in a U, V, and W three-phase structure, and the other ends of the U, V, and W three-phase coils 43 may be connected in, for example, a Y-connection method. Moreover, the driving motor 100 may be driven by a 6-step full-wave driving method using an inverter after receiving a rotor position signal from two or three Hall sensors, for example, in a motor driving circuit.

First and second bearings 61 and 62 which rotatably support the rotor are installed on the outer circumferential portion of the hollow cylindrical portion 11 of the lower housing 10.

In the upper housing 15, the first to third grooves 16a to 16c are arranged on the bottom 15b at intervals of 120 degrees with respect to the through hole 15c located at the center of the circular wall 15a.

Each of the first to third gear trains 70a to 70c are arranged in first to third grooves 16a to 16c of the upper housing 15, and are evenly arranged at intervals of 120 degrees around the hollow rotor worm gear 35 protruding upward through the through hole 15c, and first to third worm wheels 72a to 72c are formed on one-side portions of the first to third power transmission shafts 71a to 71c, respectively, and first to third worm gears 73a to 73c are formed on the other-side portions of the first to third power transmission shafts 71a to 71c.

The first to third grooves 16a to 16c have a groove shape for accommodating the first to third gear trains 70a to 70c as well as the first to third pinion gear units 80a to 80c.

The first to third gear trains 70a to 70c are evenly arranged at intervals of 120 degrees around the hollow rotor worm gear 35 protruding upward from the upper housing 15, and the first to third power transmission shafts 71a to 71c are rotatably supported at both ends thereof by three pairs of bearings 74a to 74f, respectively.

In this case, in the present invention, set screws 77a to 77f are added to the rear ends of the bearing housing 75a to 75f, respectively, to prevent the first to third power transmission shafts 71a to 71c from causing left and right displacement in the bearing housing 75a to 75f supporting three pairs of bearings 74a to 74f to limit the left and right displacement of the first to third power transmission shafts 71a to 71c.

Each of the set screws 77a to 77f may have a male thread formed on the outer circumference of the body, a "−" or "+" groove may be formed at the rear end to accommodate the front end of the driver, and the front end thereof may be curved or flat.

Each of the set screws 77a to 77f is screw-coupled to a female thread in a through hole penetrating inward from the rear end of each of the bearing housings 75a to 75f, and the front ends of the six set screws 77a to 77f are coupled in a manner of pushing and compressing both ends of the first to third power transmission shafts 71a to 71c.

The set screws 77a to 77f may be preferably installed in all six bearing housing housings 75a to 75f of the six bearings 74a to 74f that rotatably support both ends of the first to third power transmission shafts 71a to 71c, or the set screws 77a to 77f may be installed only in one-side portions of the bearing housings 75a to 75f to support one-end portions of the first to third power transmission shafts 71a to 71c to push the first to third power transmission shafts 71a to 71c in one direction to suppress the left and right displacement.

The set screws 77a to 77f may have front end portions protruding in a spherical shape to minimize contact with the ends of the first and second power transmission shafts 71a and 71b. Alternatively, it is also possible to use the set screws 77a to 77f having front end portions in a surface shape. In this invention, since the round per minute (rpm) of the driving motor 100 is few and the gear ratio thereof is large, the shapes of the front end portions of the set screws 77a to 77f are not significantly influential.

The first to third pinion gear units 80a to 80c have the first to third support shafts 83a to 83c having lower ends installed through the bottom 15b of the upper housing 15, the fourth to sixth worm wheels 81a to 81c gear-coupled to the first to third worm gears 73a to 73c are rotatably coupled to lower ends of the first to third support shafts 83a to 83c, respectively, and the first to third pinion gears 82a to 82c are integrally formed with the fourth to sixth worm wheels 81a to 81c on upper ends of the first to third support shafts 83a to 83c, respectively.

In this case, the fourth to sixth worm wheels 81a to 81c and the first to third pinion gears 82a to 82c may be integrally formed by injection molding using synthetic resin, and may be manufactured separately, assembled with each other, and rotatably coupled to the first to third support shafts 83a to 83c, respectively.

The rotational table 20 has the circular upper plate 21 and the side surface 23 extending downward from the outer circumference of the upper plate 21. The upper plate 21 has a plurality of coupling holes 22 which are penetratively formed for coupling with a main body, which is a passive body (e. g., electric car seat) installed in the rotational table 20.

A central through hole 25 through which a cable for connecting to a motor driving circuit installed outside the swivel actuator 200 passes from a stator coil 43 of the driving motor 100 and a plurality of Hall sensors provided in the Hall sensor assembly is formed at the center of the upper plate 21.

Accordingly, the cable is introduced downward through the central through hole 25 provided in the center of the upper plate and the hollow cylindrical portion 11 of the lower housing 10, and then connected to a stator coil 43 and a Hall sensor assembly 50 through a through hole 19*a* formed at the bottom of the lower housing 10. The through hole 19*a* is finished by being assembled with a through hole cover 19.

In this case, a printed circuit board (PCB) on which a motor driving circuit is implemented may be installed outside the swivel actuator 200 and then connected to the stator coil 43 and the Hall sensor assembly 50 of the driving motor 100 installed inside through the cable. However, the printed circuit board (PCB) in which the motor driving circuit is implemented may be embedded in a space formed under the lower housing 10 or under the upper housing 15.

When connected to the stator coil 43 and the Hall sensor assembly 50 of the driving motor 100 installed from the outside through the cable, the cable needs to include eight wires consisting of U, V, and W output terminals of the inverter circuit, three Hall sensors H1 to H3, Vcc, and GND.

As described above, in the present invention, the hollow cylindrical portion 11 protruding from the center of the lower housing 10 extends upward through the through hole 15*c* of the upper housing 15 and is exposed through the through hole 25 of the rotational table 20. As a result, an operation control cable of the driving motor 100 may be easily connected to the stator coil 43 and the Hall sensor assembly 50 arranged in the lower housing 10 through the through hole 11*aa* of the hollow cylindrical portion 11 from the outside, and there is no interference with the cable even if the car seat installed at the upper portion of the rotational table is rotated.

Moreover, the upper end of the hollow cylindrical portion 11 of the lower housing 10 is located in the central through hole 25, and a third bearing 63 may be installed in the center of the inner circumferential surface of the upper plate 21 to rotatably support the rotational table 20 to the outer circumference of the hollow cylindrical portion 11.

The third bearing 63 may be configured as a ball bearing in which a ball is inserted between an inner wheel and an outer wheel. In this case, the outer wheel of the third bearing 63 is supported by the bearing housing 26 protruding from the lower portion of the rotational table 20, and the inner wheel of the third bearing 63 is supported by the hollow cylindrical portion 11 of the lower housing 10 while the lower end thereof is supported by the upper end of the bearing support 64.

Furthermore, the hollow swivel actuator 200 has a stopper insertion groove formed at the upper end of the hollow cylindrical portion 11, and a stopper 13 is coupled to the stopper insertion groove to prevent the rotational table 20 from being separated.

A ring gear 24 is integrally formed inside the side surface portion 23 of the rotational table 20, and first to third pinion gears 82*a* to 82*c* of the first to third pinion gear units 80*a* to 80*c* are gear-coupled to the ring gear 24.

As described above, the present invention provides a power transmission structure capable of minimizing backlash due to a gear train change structure that minimizes the number of coupled gears, by forming the first to third worm wheels 72*a* to 72*c* and the first to third worm gears 73*a* to 73*c* in an integral form at intervals in each of the first to third power transmission shafts 71*a* to 71*c*. As a result, the present invention may reduce overall size and secure a space compared to a conventional gear train in which a plurality of spur gears are combined, thereby increasing degree of freedom in design and reducing costs.

In addition, in the present invention, the BLDC driving motor 100 is installed on the bottom 10*b* of the lower housing 10, and the first to third gear trains 70*a* to 70*c* are evenly arranged at intervals of 120 degrees inside the upper housing 15 assembled with the upper portion of the lower housing 10 to minimize backlash and suppress vibration generation. Here, the first to third gear trains 70*a* to 70*c* are formed on the bottom 15*b* of the upper housing 15 by integrally forming the first to third worm wheels 72*a* to 72*c* and the first to third worm gears 73*a* to 73*c* at intervals on the first to third power transmission shafts 71*a* to 71*c*.

As described above, in this invention, the three first to third gear trains 70*a* to 70*c* are evenly arranged and coupled with the rotor worm gear 35 of the driving motor 100 at 120 degrees intervals, and are gear-coupled to the ring gear 24 at three points by using the three fourth to sixth worm wheels 81*a* to 81*c* and the first to third pinion gears 82*a* to 82*c* of the first to third pinion gear units 80*a* to 80*c*.

Therefore, in this invention, as a power transmission mechanism that is achieved by combining the three first to third gear trains 70*a* to 70*c* with the first to third pinion gear units 80*a* to 80*c* is adopted, the rotational table 20 is rotated and driven by rotating the ring gear 24 by the three first to third pinion gears 82*a* to 82*c* arranged at equal intervals, and as a result, the number of engagement gears (the number of engagement gear teeth) may be increased to increase the brake torque, thereby increasing the fracture strength.

In addition, in the present invention, a virtual circle formed by the three first to third worm wheels 72*a* to 72*c* of the three first to third gear trains 70*a* to 70*c*, a virtual circle formed by the three first to third pinion gears 82*a* to 82*c* of the three first to third pinion gear units 80*a* to 80*c*, and the rotational table 20 may be arranged concentrically with respect to the hollow rotor worm gear 35, thereby suppressing vibration generation of the rotational table.

As described above, when the first to third gear trains 70*a* to 70*c* are arranged inside the upper housing, it is possible to reduce a tolerance between gears, but it is difficult to completely reduce the tolerance. That is, a gap between the gears is minimized but a tolerance between gears is generated to form a gap, and thus the rotational table 20 gear-coupled to the first to third pinion gears 82*a* to 82*c* and the passive object to be driven thereon may be shaken in the left and right directions.

This problem may be caused by the occurrence of the left and right displacement of both ends of the power transmission shafts forming the gear train in the bearing housing. In this invention, both ends of each of the first to third power transmission shafts 71*a* to 71*c* are rotatably supported by six bearings 74*a* to 74*f*, respectively.

The six bearings 74*a* to 74*f* are embedded in the bearing housings 75*a* to 75*f* fixedly installed on the bottom 15*b* of the upper housing 15. In this invention, set screws 76*a* to 76*f* are added to the rear ends of the bearing housings 75*a* to 75*f* so that both ends of each of the first to third power transmission shafts 71*a* to 71*c* suppress the occurrence of left and right displacement in the bearing housings 75*a* to 75*f*.

As a result, the left and right displacements of the first to third power transmission shafts 71*a* to 71*c* are suppressed to eliminate a tolerance (gap) generated when the first to third worm gears 73*a* and 73*b* of the first to third gear trains 70*a* to 70*c* and the fourth to sixth worm wheels 81*a* to 81*c* of the first to third pinion gear units 80*a* to 80*c* are gear-coupled with each other. In addition, the gap between the first to third pinion gears 82*a* to 82*c* of the first to third pinion gear units 80*a* to 80*c* and the ring gear 24 of the rotational table 20 may be removed to zero the backlash.

The compression between the set screws 76*a* to 76*f* and the first to third power transmission shafts 71*a* to 71*c* may push the first to third power transmission shafts 71*a* to 71*c* to suppress the left and right movement of the first to third power transmission shafts 71*a* to 71*c*, by advancing the set screws 76*a* to 76*f* in one direction from the outside through the set screw adjustment through hole 12 formed in the wall 15*a* of the upper housing 15, after the first to third power transmission shafts 71*a* to 71*c* are assembled inside the upper housing 15.

Hereinafter, an operation of the hollow swivel actuator 200 according to the present invention will be described with reference to FIGS. 1 to 8.

When the BLDC driving motor 100 installed on the bottom of the lower housing 10 is operated in the hollow swivel actuator 200 of this invention, the rotor 30 rotates and the rotor worm gear 35 formed integrally on the upper side of the rotor 30 rotates in the same direction.

When the rotor worm gear 35 rotates, the first to third worm wheels 72*a* to 72*c* of the first to third gear trains 70*a* to 70*c*, which are arranged at intervals of 120 degrees on the outer circumference of the rotor worm gear 35, rotate, to accomplish primary reduction, and the first to third power transmission shafts 71*a* to 71*c* also rotate.

As a result, the first to third worm gears 73*a* to 73*c* formed on the other-side portions of the first to third power transmission shafts 71*a* to 71*c* rotate the fourth to sixth worm wheels 81*a* to 81*c* of the first to third pinion gear units 80*a* to 80*c* to be gear-coupled to the first to third worm gears 73*a* to 73*c*, to thus accomplish secondary reduction.

Accordingly, the first to third pinion gears 82*a* to 82*c* located at the top ends of the first to third pinion gear units 80*a* to 80*c* are rotated and driven, and the first to third pinion gears 82*a* to 82*c* are gear-coupled to the ring gear 24 provided on the rotational table 20 at intervals of 120 degrees to rotate the ring gear 24 in the same direction, thereby accomplishing tertiary reduction.

In general, a reduction ratio of a reducer is calculated as (the number of driven gear teeth/the number of driving pinion gear teeth), and in the case of multi-stage gear coupling, a total reduction ratio is calculated as the product of each reduction ratio.

In this case, in the present invention, when a gear ratio (reduction ratio) (R1) between the rotor worm gear 35 of the driving motor 100 and the first to third worm wheels 72*a* to 72*c* of the first to third gear trains 70*a* to 70*c* is set to 20:1, a gear ratio (reduction ratio) (R2) between the first to third worm gears 73*a* to 73*c* and the fourth to sixth worm wheels 81*a* to 81*c* is set to 10:1, and a gear ratio (reduction ratio) (R3) between the first to third pinion gears 82*a* to 82*c* and the ring gear 24 is set to 2:1, a total reduction ratio of 400:1 may be easily realized.

In this case, when the gear ratio (reduction ratio) between the gears may be set to be smaller toward the output (i.e., R1>R2>R3), and even if a large torque conversion is performed at the final end, a stable high torque output may be obtained.

For example, when the BLDC driving motor 100 is rotated at 800 rpm, the swivel actuator 200 of the present invention is reduced to 400:1 when the total reduction ratio is 400:1 by the three-stage reduction, and the rotational table 20 is reduced to a low speed of 2 rpm and the rotation torque is increased 400 times, resulting in a large torque increase.

When the swivel actuator 200 of the present invention is applied to a car seat in a vehicle, it is possible to rotate the car seat by a desired angle when conducting a meeting or the like inside the vehicle to conduct the meeting while the occupant faces each other.

As described above, in the present invention, the first to third gear trains and the first to third pinion gear units are arranged at intervals of 120 degrees inside the upper housing, thereby minimizing backlash and suppressing vibration generation.

In addition, in the present invention, a set screw is added to the rear end of the bearing housing to suppress occurrence of left and right displacement of both ends of each of the first to third power transmission shafts in the bearing housing. In the present invention, when the set screw is advanced in one direction, after assembling the first to third gear trains inside the upper housing, the first to third power transmission shafts may be pushed forward to suppress the left and right movement of the first to third power transmission shafts.

As a result, the tightening of the set screw reduces the left and right displacement of the first to third power transmission shafts, eliminating the tolerance (gap) that occurs when the gears are coupled between the first to third worm gears of the first to third gear trains and the fourth to sixth worm wheels of the first to third pinion gear units. In addition, the gap between the first to third pinion gears of the first to third pinion gear units and the ring gear of the rotational table may be removed to zero backlash.

Furthermore, in this invention, the worm wheel and the output worm gear are integrally formed at intervals, in the gear train, and the worm wheel is gear-coupled to the rotor worm gear integrated on top of the rotor, and the worm gear is gear-coupled to the worm wheel of the pinion gear unit to transmit rotational power to the rotational table, resulting in power transmission and reduction and causing torque conversion.

Moreover, in this invention, the driving motor is arranged in the lower housing, and the first to third gear trains and the first to third pinion gear units are stacked and assembled in the upper housing, so that the compartment between the driving motor and the gear trains may be easily organized, and the productivity of assembly work may be improved.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The swivel actuator according to the present invention may be applied for rotating a passive object such as a car seat installed on a rotational table so as to rotate left and right together with the rotational table.

What is claimed is:
1. A hollow swivel actuator comprising:
a lower housing having a hollow cylindrical portion protruding upward at a center thereof;
an upper housing stacked and assembled on an upper portion of the lower housing and having a through hole formed in a central portion thereof in which the hollow cylindrical portion protrudes upward through the through hole;

a driving motor arranged on a bottom surface of the lower housing and having a cylindrical rotor worm gear integrally formed on an outer circumference of a cylindrical rotor support extending upward from the rotor;

first to third gear trains arranged and coupled at intervals of 120 degrees on the outer circumference of the rotor worm gear protruding through the upper housing, and having first to third worm wheels formed to be gear-coupled to the rotor worm gear on one side of each of first to third power transmission shafts to achieve primary reduction and first to third worm gears formed on the other side of each of the first to third power transmission shafts;

first to third pinion gear units having fourth to sixth worm wheels formed on bottom ends thereof so as to be gear-coupled to the first to third worm gears to achieve secondary reduction, and first to third pinion gears integrally formed on top ends thereof; and a rotational table in which the first to third pinion gears of the first to third pinion gear units are gear-coupled to a ring gear integrally formed inside a side portion thereof to achieve a tertiary reduction.

2. The hollow swivel actuator of claim 1, wherein both ends of each of the first to third power transmission shafts are rotatably supported by a plurality of bearings, and a plurality of set screws are installed in a bearing housing in which the plurality of bearings are embedded to suppress the occurrence of left and right displacements of the first to third power transmission shafts.

3. The hollow swivel actuator of claim 2, further comprising a plurality of set screw adjustment through holes formed on a wall of the upper housing and used to fix the first to third power transmission shafts by pushing the plurality of set screws from the outside to one side.

4. The hollow swivel actuator of claim 1, wherein a first reduction ratio of the primary reduction, a second reduction ratio of the secondary reduction, and a third reduction ratio of the tertiary reduction are sequentially set less toward a rear end.

5. The hollow swivel actuator of claim 1, wherein the driving motor comprises:

a rotor having a cylindrical rotor support having a cup shape at a lower end thereof, and rotatably coupled to an outer circumference of the hollow cylindrical portion;

a stator which is arranged on the outer side of the rotor with an air gap, generates a rotating magnetic field, and is arranged on the bottom of the housing to rotate the rotor;

first and second bearings arranged between the cup-shaped lower end of the rotor support and a lower end of the hollow cylindrical portion to rotatably support the rotor, and stacked in series; and a bearing support press-coupled to the outer circumference of the hollow cylindrical portion to press the second bearing.

6. The hollow swivel actuator of claim 1, further comprising:

first and second bearings arranged between a lower end of the cylindrical rotor support and a lower end of the hollow cylindrical portion of the lower housing to rotatably support the rotor and stacked in series; and a third bearing rotatably supporting the rotational table on an outer circumference of a top end of the hollow cylindrical portion.

7. The hollow swivel actuator of claim 6, further comprising a bearing support press-coupled to the outer circumference of the cylindrical rotor support and arranged between the second bearing and the third bearing to press the second bearing.

8. The hollow swivel actuator of claim 1, further comprising first to third support shafts having lower ends fixedly installed through the bottom of the upper housing and rotatably supporting the first to third pinion gear units, respectively.

9. The hollow swivel actuator of claim 8, wherein a virtual circle formed by the first to third support shafts forms the same concentric circle as the rotational table, the first to third support shafts are arranged at intervals of 120 degrees on the virtual circle, and the first to third pinion gears are gear-coupled to the ring gear at three points at intervals of 120 degrees.

10. The hollow swivel actuator of claim 1, wherein the rotor support, the cylindrical rotor worm gear, the first virtual circle formed by the first to third worm wheels, and a second virtual circle formed by the first to third support shafts, and the rotational table are arranged based on the same concentric circle.

* * * * *